US009509728B2

(12) United States Patent
Ong

(10) Patent No.: US 9,509,728 B2
(45) Date of Patent: Nov. 29, 2016

(54) SOFTWARE DEFINED NETWORKING SYSTEMS AND METHODS VIA A PATH COMPUTATION AND CONTROL ELEMENT

(71) Applicant: Lyndon Y. Ong, Sunnyvale, CA (US)

(72) Inventor: Lyndon Y. Ong, Sunnyvale, CA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 14/579,265

(22) Filed: Dec. 22, 2014

(65) Prior Publication Data

US 2015/0113151 A1 Apr. 23, 2015

Related U.S. Application Data

(63) Continuation of application No. 13/646,032, filed on Oct. 5, 2012, now Pat. No. 8,942,226.

(51) Int. Cl.

| | |
|---|---|
| ***H04L 12/24*** | (2006.01) |
| ***H04L 29/06*** | (2006.01) |
| ***H04L 12/717*** | (2013.01) |

(52) U.S. Cl.
CPC ........... *H04L 65/1069* (2013.01); *H04L 41/12* (2013.01); *H04L 45/42* (2013.01)

(58) Field of Classification Search
CPC .... H04L 65/1069; H04L 41/12; H04L 45/42
See application file for complete search history.

(56) References Cited

U.S. PATENT DOCUMENTS

| | | | | | |
|---|---|---|---|---|---|
| 7,164,679 | B2 | | 1/2007 | Kotha et al. | |
| 7,475,001 | B2 | | 1/2009 | Bordes et al. | |
| 8,127,129 | B2 | | 2/2012 | Chen | |
| 8,666,247 | B2 | | 3/2014 | Srinivasan et al. | |
| 8,787,154 | B1 | * | 7/2014 | Medved | H04L 45/64 370/225 |
| 8,824,274 | B1 | * | 9/2014 | Medved | H04L 41/12 370/217 |
| 8,855,014 | B2 | * | 10/2014 | Previdi et al. | 370/254 |
| 9,178,801 | B1 | * | 11/2015 | Guichard | H04L 12/6418 |
| 9,391,923 | B2 | * | 7/2016 | Bryskin | H04L 47/829 |
| 2004/0093399 | A1 | | 5/2004 | Knebel et al. | |
| 2007/0064698 | A1 | | 3/2007 | Appanna | |
| 2008/0095176 | A1 | | 4/2008 | Ong et al. | |
| 2009/0142056 | A1 | | 6/2009 | Bernstein et al. | |
| 2009/0217347 | A1 | * | 8/2009 | Chen | H04L 45/00 726/1 |
| 2010/0220996 | A1 | | 9/2010 | Lee et al. | |
| 2011/0153829 | A1 | * | 6/2011 | Kwon | H04L 41/12 709/226 |

(Continued)

OTHER PUBLICATIONS

Demonstration of Flexible Optical Network Based on Path Computation Element; Cugini et al. Journal of Lightwave Technology; Mar. 1, 2012.*

(Continued)

*Primary Examiner* — Jay R Patel
(74) *Attorney, Agent, or Firm* — Clements Bernard PLLC; Christopher L. Bernard; Lawrence A. Baratta, Jr.

(57) ABSTRACT

Software Defined Networking systems and methods are described via a Path Computation and Control Element (PCCE) that is based in part on a Path Computation Element (PCE). A common, simple interface is designed based on an existing PCE interface that allows a centralized entity (i.e., a Path Computation and Control Element or PCCE) to control the initiation of new connections or tunnels and by default to manage the state of these connections or tunnels once established. In particular, the systems and methods create an extension to the PCE architecture to allow a centralized application or applications to control the creation, rerouting and deletion of connections within a network.

20 Claims, 8 Drawing Sheets

30
32
PATH COMPUTATION AND CONTROL ELEMENT
PCC
24
16

(56) References Cited

U.S. PATENT DOCUMENTS

| | | | | |
|---|---|---|---|---|
| 2011/0188373 | A1 | 8/2011 | Saito | |
| 2012/0207467 | A1 | 8/2012 | Lee | |
| 2012/0230330 | A1* | 9/2012 | Fu | H04L 45/68 370/389 |
| 2013/0315580 | A1* | 11/2013 | Boertjes et al. | 398/5 |
| 2013/0329601 | A1 | 12/2013 | Yin et al. | |
| 2013/0336108 | A1 | 12/2013 | Vasseur et al. | |
| 2013/0336159 | A1* | 12/2013 | Previdi et al. | 370/254 |
| 2014/0003232 | A1 | 1/2014 | Guichard et al. | |
| 2014/0348068 | A1* | 11/2014 | Morper | H04W 88/16 370/328 |

OTHER PUBLICATIONS

Silvana Greco Polito, Mohit Chamania, Admela Jukan; "Extending the Inter-domain PCE Framework for Authentication and Authorization in GMPLS Networks"; IEEE Communications Society in the IEEE ICC 2009 proceedings; (C)2009 IEEE.

Jordi Perello, Guillem Hernandez-Sola, Fernando Agraz, Salvatore Spadaro, Jaume Comellas; "Scalable Path Computation Flooding Approach for PCE-Based Multi-domain Networks"; (C) 2010 ETRI-ETRI Journal, vol. 32, No. 4, Aug. 2010.

Lyndon Y. Ong; "Multi-Domain PCE and Other Trends in the Control Plane"; Ciena Corporation, Mar. 2012.

Lyndon Y. Ong; "Ciena's Intelligent Optical Network Deployment and Directions"; Lyndon Y. Ong, Snr. Technology Director, Ciena Chair, OIF Technical Committee—Session 102—Dec. 2, 2009.

Guru Parulkar, Saurav Das, Nick McKeown, Preeti Singh, Dan Getachew, Lyndon Y. Ong; "Packet and Circuit Covergence with OpenFlow"; Stanford Clean Slate Program—http://cleanslate.stanford.edu—Funded by Cisco, Deutsche Telekom, DoCoMo, Ericsson, Google, LightSpeed, MDV, NEC, NSF, Xilinx—Apr. 17, 2008.

Saurav Das, Guru Parulkar, Nick McKeown, Preeti Singh, Daniel Getachew, Lyndon Ong; "Packet and Circuit Network Convergence with OpenFlow"; Presentation 2008.

OpenFlow Switch Specification, Version 1.10 Implemented (Wire Protocol 0x02)—Feb. 28, 2011.

Nick McKeown, Tom Anderson, Hari Balakrishnan, Guru Parulkar, Larry Peterson, Jennifer Rexford, Scott Shenker, Jonathan Turner; "OpenFlow: Enabling Innovation in Campus Networks"; Whitepaper—Mar. 14, 2008.

Alessio Giorgetti et al: "Path state-based update of PCE traffic engineering database in wavelength switched optical networks", IEEE Communications Letters, IEEE Service Center, Piscataway, NJ, US, vol. 14, No. 6, Jun. 1, 2010, pp. 575-577, XP011310537, ISSN: 1089-7798 paragraphs [011.], [III.].

Crabbe Google E et al: "PCEP Extensions for Stateful PCE; draftietf- pce-statef ul-pce-00. txt", PCEP Extensions for Stateful PCE; draft-ietf-pcestateful-pce-00.txt, Internet Engineering Task Force, IETF; Standardworkingdraft, Internet Society (ISOC) 4, Rue Des Falaises CH—1205 Geneva, Switzerland, Feb. 29, 2012, pp. 1-51, XP015080865, * paragraphs [002.], [03.2], [05.2], [05.3], [006.]-[07.2].

JP Vasseur et al: "Path Computation Element (PCE) Communication Protocol (PCEP); rfc5440.txt", Path Computation Element (PCE) Communication Protocol (PCEP); rfc5440.txt, Internet Engineering Task Force, IETF; Standard, Internet Society (ISOC) 4, Rue Des Falaises CH—1205 Geneva, Switzerland, Mar. 1, 2009, XP015065509,* paragraphs [06.3], [06.6].

Amante Level 3 Communications S et al: "Topology API Use Cases; draft-amante-irs-topology-use-cases-00.txt", Topology API Use Cases; draft-amante-irs-topology-usecases-00.txt, Internet Engineering Task Force, IETF; Standardworkingdraft, Internet Society (ISOC) 4, Rue Des Falaises CH—1205 Geneva, Switzerland, Oct. 3, 2012, pp. 1-21, XP015084698, *paragraphs [001.], [002.], [03.2], [04.2] **figures 2.,4.

* cited by examiner

SOFTWARE DEFINED NETWORKING SYSTEMS AND METHODS VIA A PATH COMPUTATION AND CONTROL ELEMENT

CROSS-REFERENCE TO RELATED APPLICATION(S)

The present non-provisional patent application/patent is a continuation of U.S. patent application Ser. No. 13/646,032, filed on Oct. 5, 2012, and entitled "SOFTWARE DEFINED NETWORKING SYSTEMS AND METHODS VIA A PATH COMPUTATION AND CONTROL ELEMENT," the contents of which are incorporated in full by reference herein.

FIELD OF THE INVENTION

Generally, the field of art of the present disclosure pertains to networking systems and methods, and more particularly, to Software Defined Networking systems and methods via path computation and control.

BACKGROUND OF THE INVENTION

Automated connection control in optical or connection-oriented networks operates currently with fully distributed control, where requests for connections are made from the source node, either triggered by a client request (switched connection (SC)) or by management system (soft permanent connection (SPC)). A client request can utilize a standard user-network interface protocol such as have been defined in the Internet Engineering Task Force (IETF) or in the Optical Internetworking Forum (OIF), while management system interfaces are typically highly equipment dependent, as the management interface needs to be tailored to manage each device's unique set of characteristics.

Path Computation Elements (PCEs) are described, for example, in RFC 4655 "A Path Computation Element (PCE)-Based Architecture," (August 2006), the contents of which are incorporated by reference herein. This includes another standardized interface that has been defined for path computation, where the source node does not do its own path computation upon receiving a connection request (either SC or SPC) but makes a query to the centralized PCE. The Path Computation Client (PCC) requests a path to a specified destination with some constraints such as connection type or bandwidth, and the PCE responds with a list of nodes and links to be used, then the PCC creates the specified path using signaling. PCCs are also described, for example, in RFC 4655. The PCE was originally defined to be stateless, that is, having no memory retained after a path query has been received and responded to. A new extension to PCE now allows the PCE to retain state information, and in some cases affect the state of an established connection, for which the source node has previously delegated control to the PCE. This involves synchronization of the connection state between the PCC and PCE so that the PCE has an initial record of the connection state, then optionally delegation of state control from the PCC to the PCE, and then state updates from either side, from the PCC to reflect any events such as failures and from the PCE to reflect changes that it wants to make to the connection such as rerouting or deleting.

Finally work on Software Defined Networks (SDN) calls for the ability to centrally program provisioning of forwarding in the network in order for more flexible and precise control over network resources to support new services. OpenFlow (www.openflow.org) is an implementation of this which requires a special OpenFlow interface from the controller to each switch in the network in order to provision the forwarding table at each switch along a connection path in order to instantiate the forwarding behavior needed for the connection. OpenFlow is described, for example, in the OpenFlow Switch Speciation, Version 1.1.0 (February 2011), the contents of which are incorporated by reference herein.

In the current state of the art, using distributed control plane, the establishment of connections is typically disjointed, as for SC connections there is no central coordination but each request is responded to separately by a receiving source node, while for SPC connections coordination of multiple connections is only possible within a limited span of control of a single management system, and does not easily expand to handle multiple different vendors' equipment or even multiple types of equipment made by a single vendor, which may use different management systems.

PCE allows centralization of path computation, but in its stateless mode the control of the connections themselves is still distributed to the source node, while in stateful mode control can only be exerted by the PCE after the connection has been established and the source node has delegated control to the PCE. The PCE does not have any way to exert control on the initial establishment of the connection, and must rely on the source node to first request path computation and secondly delegate control of the connection to the PCE. The source node can take back control of the connection at any time. Also, OpenFlow/SDN fully centralized control does not take advantage of existing distributed intelligence in the switch that provides greater efficiency and reliability than fully centralized control.

BRIEF SUMMARY OF THE INVENTION

The present disclosure overcomes the aforementioned limitations with Software Defined Networking systems and methods using a Path Computation and Control Element (PCCE). The PCCE is based in part on a Path Computation Element (PCE) with additional functionality of a centralized entity controlling the initiation of new connections or tunnels and managing the state of the connections or tunnels once established. In particular, extensions are provided to the PCE architecture to allow a centralized application or applications to control the creation, rerouting and deletion of connections within a network. Compared to other mechanisms such as OpenFlow, the centralized controller is free from interacting with each node in the connection (instead relying on the signaling intelligence in each node for distributed creation of the connection). Because it is based in part on PCE technology, the PCCE takes advantage of PCE infrastructure that has already been standardized, tested and implemented as an interface to network elements.

In an exemplary embodiment, a path computation and control method includes receiving a request for a new connection in a network at a Path Computation and Control Element (PCCE); computing a path through the network based on a network graph of current topology in the network and applying computational constraints; sending an update message to one of a source network element and a Path Computation Client (PCC) with the path and a new connection identifier for the path, wherein the PCCE is configured to initiate and control creation of a connection based on the path while directly interacting with the one of the source network element and the PCC; receiving a report message from the one of the source network element and the PCC that the connection has been created based on the computed path; and updating the current topology based on the report message. The path computation and control method can further include associating by the PCCE with the one of the source network element and the PCC based on one of a preconfigured list and determination based on the current topology. The path computation and control method can further include receiving network topology updates through a control plane operating in the network; and choosing a set of network elements in the network to be one of the source network element and the PCC based on the current topology.

The path computation and control method can further include sending an open message by the PCCE to the one of the source network element and the PCC with inclusion of the Connection Initiator flag therein; and receiving one of a KeepAlive response and an error indication from the one of the source network element and the PCC. The path computation and control method can further include receiving the request for the new connection at the PCCE from an application over a northbound interface; and using the northbound interface to convey network updates from the PCCE to the application. The update message can include a Path Computation Element (PCE) Communication Protocol update message for stateful PCE. The update message can include a flag to indicate Initiation Requested. The PCCE can be configured to provide the new connection identifier as a unique identifier. The report message can include a Path Computation Element (PCE) Communication Protocol report message from the one of the source network element and the PCC to the PCCE to indicate the connection is setup. The PCCE can be configured to operate as a Path Computation Element (PCE) for conveying information with the one of the source network element and the PCC and to operate as a PCC for providing initiation functionality of the request. The PCCE can rely upon a distributed control plane in the network to establish the connection once the update message is sent to the one of the source network element and the PCC.

In another exemplary embodiment, a network entity providing path computation and control includes a network interface; a processor; and memory storing instructions that, when executed, cause the processor to: receive a request for a new connection in a network; compute a path through the network based on a network graph of current topology in the network and applying computational constraints; send, via the network interface, an update message to one of a source network element and a Path Computation Client (PCC) with the path and a new connection identifier for the path, wherein the network entity is configured to initiate and control creation of a connection based on the path while directly interacting with the one of the source network element and the network entity; receive, via the network interface, a report message from the one of the source network element and the PCC that the connection has been created based on the computed path; and update the current topology based on the report message. The instructions, when executed, can further cause the processor to: associate with the one of the source network element and the PCC based on one of a preconfigured list and determination based on the current topology. The instructions, when executed, can further cause the processor to: receive network topology updates through a control plane operating in the network; and choose a set of network elements in the network to be one of the source network element and the PCC based on the current topology.

The instructions, when executed, can further cause the processor to: send, via the network interface, an open message to the one of the source network element and the PCC with inclusion of the Connection Initiator flag therein; and receive, via the network interface, one of a KeepAlive response and an error indication from the one of the source network element and the PCC. The instructions, when executed, can further cause the processor to: receive, via the network interface, the request for the new connection from an application over a northbound interface; and use the northbound interface to convey network updates to the application via the network interface. The update message can include a Path Computation Element (PCE) Communication Protocol update message for stateful PCE; wherein the update message can include a flag to indicate Initiation Requested; and wherein the report message can include a Path Computation Element (PCE) Communication Protocol report message from the one of the source network element and the PCC to the network entity to indicate the connection is setup.

In yet another exemplary embodiment, a network includes a plurality of network elements communicatively coupled therebetween; a control plane operating between the plurality of network elements; and a Path Computation and Control Element (PCCE) communicatively coupled to at least one of the plurality of network elements; wherein the PCCE is configured to: receive a request for a new connection in the network; compute a path based on a network graph of current topology in the network and applying computational constraints; send an update message to one of a source network element and a Path Computation Client (PCC) with the path and a new connection identifier for the path, wherein the PCCE is configured to initiate and control creation of a connection based on the path while directly interacting with the one of the source network element and the PCC; receive a report message from the one of the source network element and the PCC that the connection has been created based on the computed path; and update the current topology based on the report message. The PCCE can be configured to operate as a combined stateful Path Computation Element (PCE) and Path Computation Client (PCC) with an interface from an application for receiving the request.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, the present disclosure relates to Software Defined Networking systems and methods via a Path Computation and Control Element (PCCE) that is based in part of a Path Computation Element (PCE). In the systems and methods described herein, a common, simple interface is designed based on an existing PCE interface, but allowing a centralized entity (i.e., a Path Computation and Control Element or PCCE) to control the initiation of new connections or tunnels, and by default also manage the state of these connections or tunnels once established. In particular, the systems and methods create an extension to the PCE architecture to allow a centralized application or applications to control the creation, rerouting and deletion of connections within a network. Compared to other mechanisms such as OpenFlow, the centralized controller (i.e., the PCCE) does not have to interact with each node in the connection (instead relying on the signaling intelligence in each node for distributed creation of the connection). Because it is based on PCE technology, it takes advantage of PCE infrastructure that has already been standardized, tested and implemented as an interface to network elements.

Figure 1A:
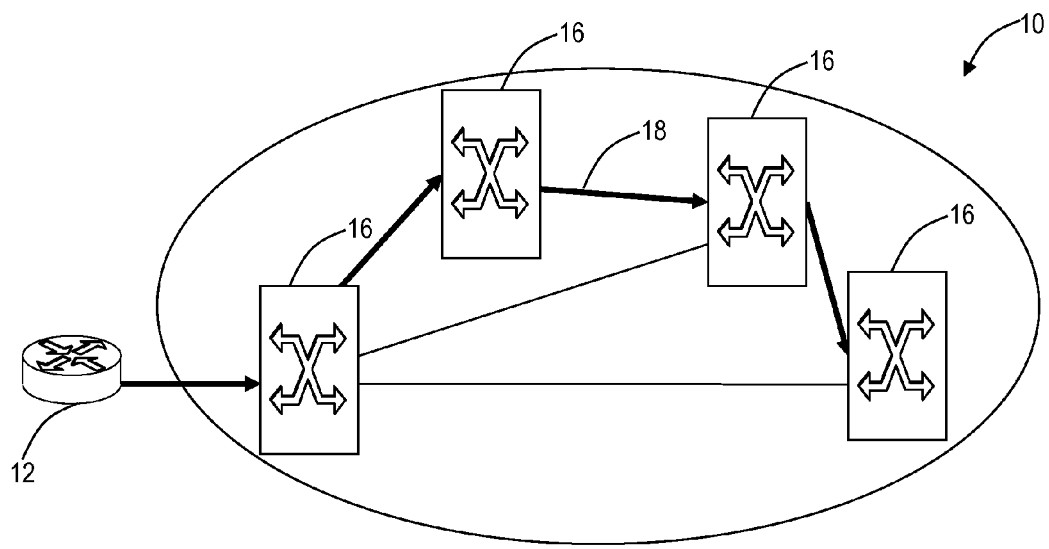
FIGS. 1A-1B are network diagrams of a network with a client (FIG. 1A) and a management system (FIG. 1B) requesting connections.
Figure 1B:
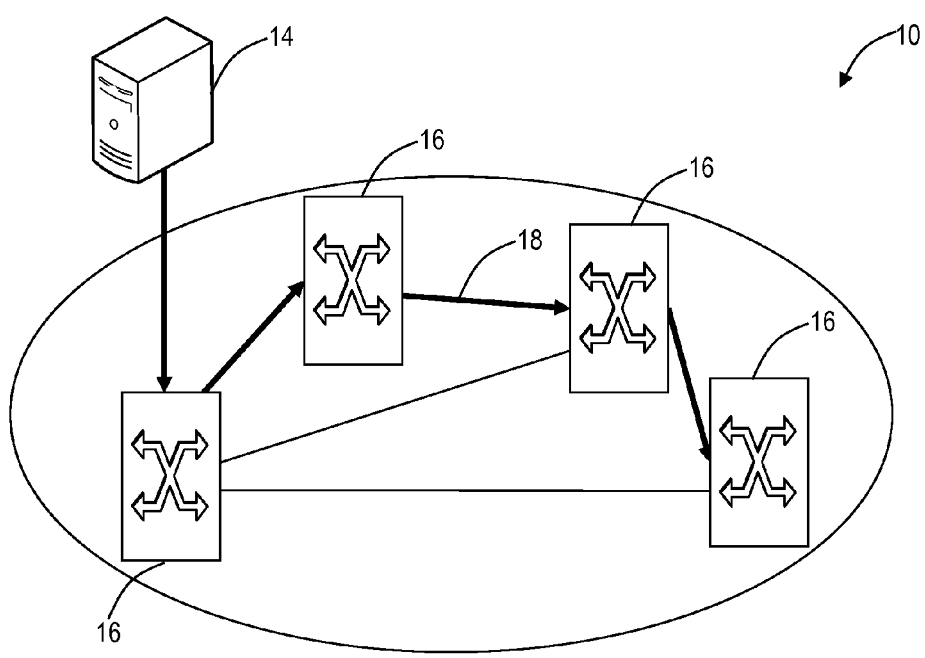

Referring to FIGS. 1A-1B, in exemplary embodiments, network diagrams illustrate a network 10 with a client 12 (FIG. 1A) and a management system 14 (FIG. 1B) requesting connections. The network 10 includes a plurality of network elements 16 interconnected with one another. The network elements 16 can include, without limitation, optical network elements, switches, routers, cross-connects, etc. configured to use a control plane for management thereof. In an exemplary embodiment, the network elements 16 can include a nodal device that consolidates the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing Layer 0, 1, 2, and/or 3 consolidation. In another exemplary embodiment, the network elements 16 cay include any of an OTN add/drop multiplexer (ADM), SONET/SDH ADM, a multi-service provisioning platform (MSPP), a digital cross-connect (DCS), an optical cross-connect, a WDM/DWDM terminal, a switch, a router, and the like.

Generally, the control plane includes software, processes, algorithms, etc. that control configurable features of the network 10, such as automating discovery of the network elements 12, capacity on the links 14, port availability on the network elements 12, connectivity between ports; dissemination of topology and bandwidth information between the network elements; calculation and creation of paths for connections; network level protection and restoration; and the like. Exemplary control planes can include, without limitation, Automatically Switched Optical Network (ASON) as defined in inter alia G.8080/Y.1304, Architecture for the automatically switched optical network (ASON) (02/2005), the contents of which are herein incorporated by reference, and the like; Generalized Multi-Protocol Label Switching (GMPLS) Architecture as defined in inter alia Request for Comments: 3945 (10/2004), the contents of which are herein incorporated; Optical Signaling and Routing Protocol (OSRP) from Ciena Corporation which is an optical routing protocol similar to PNNI (Private Network-to-Network Interface) and MPLS (Multiprotocol Label Switching); and the like. Those of ordinary skill in the art will recognize the network 10 and the control plane may utilize any type of control plane for controlling the network elements 16 and establishing connections therebetween.

GMPLS, for example, is a fully distributed control plane with each network element 16 sending data to a next network element 16 to create a connection 18 in the network 10. FIG. 1A illustrates a switched connection (SC) created by the client 12. In particular, the client 12 can include, without limitation, optical network elements, switches, routers, cross-connects, servers, etc. The client 12 is configured to initiate a request for the connection 18 to one of the network elements 16 via a User-Network Interface (UNI) protocol. The control plane in turn is configured to determine a path and use a signaling protocol to establish the connection 18 in the network 10. FIG. 1B illustrates a semi-permanent connection (SPC) created by the management system 14. The management system 14 can include, without limitation, a network management system (NMS), an element management system (EMS), an operations support system (OSS), a craft interface (CI), a command line interface (CLI), etc. The management system 14 is configured to communicate to a source network element 16 for the connection 18, and uses network management interfaces and protocols.

Figure 2:
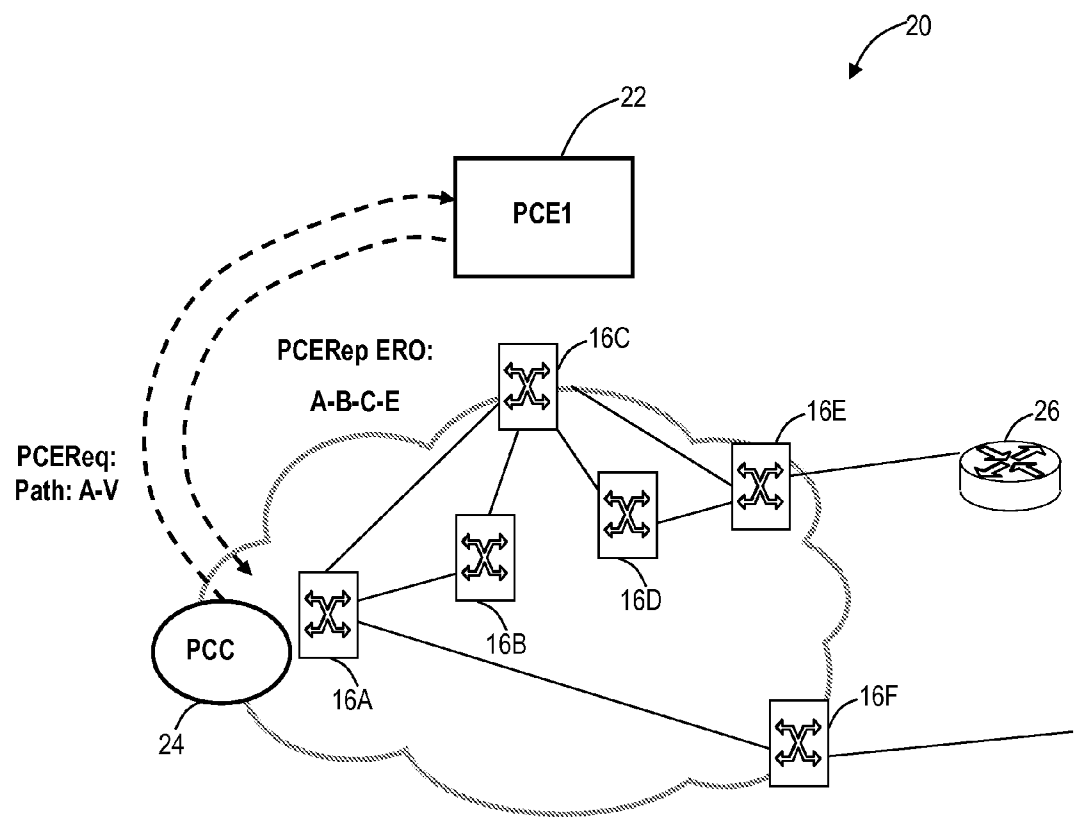
FIG. 2 is a network diagram of a network of network elements with a PCC requesting connections from a PCE.

Referring to FIG. 2, in an exemplary embodiment, a network diagram illustrates a network 20 of network elements 16A-16F with a PCE 22 and a PCC 24. The PCE 22 is an entity (e.g., component, application, or network node) that is capable of computing a network path or route based on a network graph and applying computational constraints. The PCE 22 entity is an application that can be located within one of the network elements 16 or a component, such as on server communicatively coupled to the network elements 16. The PCC 24 is a client application requesting a path computation to be performed by the PCE 22. In addition to RFC 4655, PCEs and PCCs are defined in various RFC's from the IETF such as, for example, RFC 4657 "Path Computation Element (PCE) Communication Protocol Generic Requirements," RFC 4674 "Requirements for Path Computation Element (PCE) Discovery," RFC 4927 "Path Computation Element Communication Protocol (PCECP) Specific Requirements for Inter-Area MPLS and GMPLS Traffic Engineering," RFC 5376 "Inter-AS Requirements for the Path Computation Element Communication Protocol (PCECP)," RFC 5394 "Policy-Enabled Path Computation Framework," RFC 5440 "Path Computation Element (PCE) Communication Protocol (PCEP)," and the like, each of which is incorporated by reference herein.

An exemplary advantage of the PCE 22 and the PCC 24 is that the PCE 24 enables outside clients to obtain optimal paths in the network 20 without having to know the full topology and the like of the network 20. To perform path computations, the PCE 22 stores the network 20 topology and resource information in a database. To request path computation services to a PCE, RFC 5440 defines the PCE Communication Protocol (PCEP) for communications between the PCC 24 and the PCE 22, or between two PCEs. The PCC 24 can initiate a path computation request to the PCE 22 through a Path Computation Request (PCReq) message, and then the PCE 22 will return the computed route to the requesting PCC 24 in response to a previously received PCReq message through a PCEP Path Computation Reply (PCRep) message. In the example of FIG. 2, the PCC 24 is at or communicatively coupled to the network element 16A and requests a path from the network element 16A to a node 26 which is communicatively coupled to the network element 16E. This request from the PCC 24 to the PCE 22 is via a PCReq message for the path and identifies the destination (i.e., the node 26) and any constraints. The PCE 22 in turn computes a path and returns an Explicit Route Object (ERO) to the PCC 24 in a PCRep which is a sequence of nodes and links to be followed. For example, the ERO can include network elements 16A, 16B, 16C, 16E to the node 26. The source network element 16A uses this information to create the connection via signaling between the network elements 16.

Figure 3A:
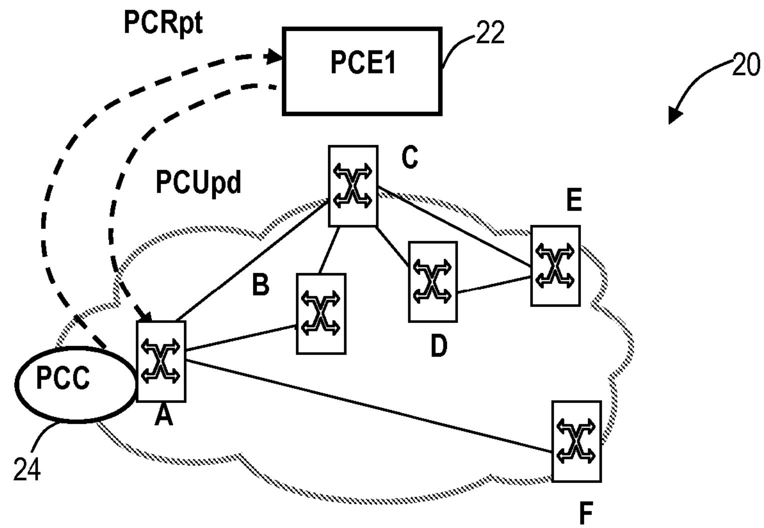
FIGS. 3A-3C are network diagrams of a network with the PCE and the PCC for stateful PCE.
Figure 3B:
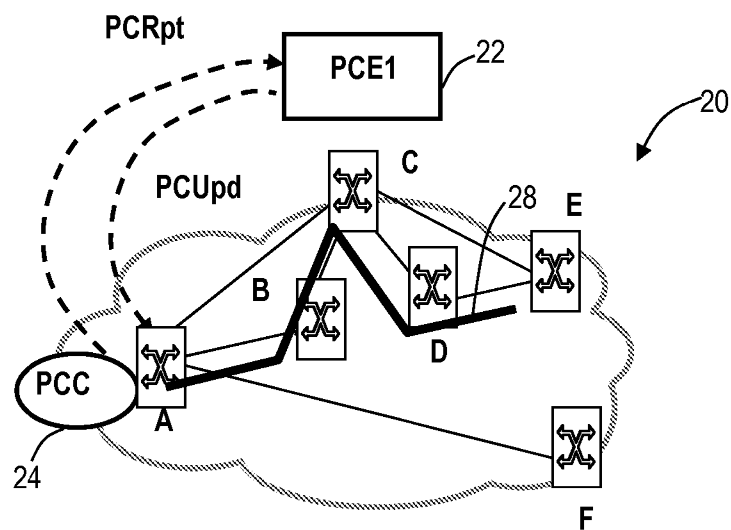
Figure 3C:
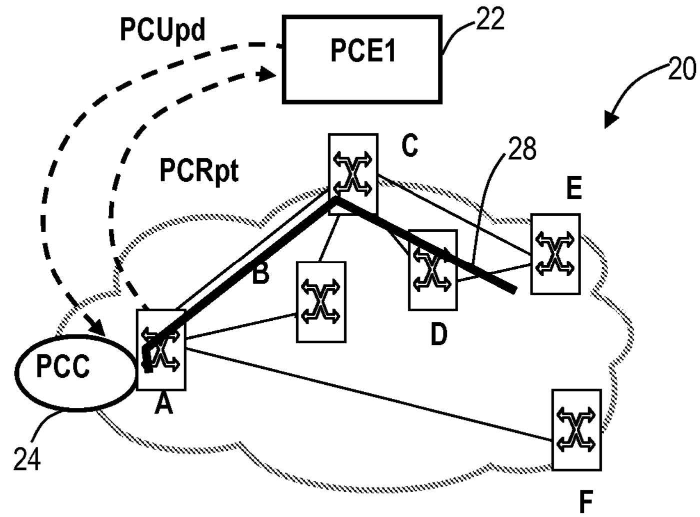

Referring to FIGS. 3A-3C, in exemplary embodiments, network diagrams illustrate the network 20 with the PCE 22 and the PCC 24 for stateful PCE. As per RFC 4655, the PCE 22 can be stateless or stateful. Compared to a stateless PCE, such as the PCE 22 in FIG. 2, a stateful PCE stores not only the network state, but also the set of computed paths and reserved resources in use in the network 20. Note that [RFC4655] further specifies that the database for the PCE 22 contains link state and bandwidth availability as distributed by the network elements 16 or collected via other means. Even if such information can provide finer granularity and more details, it is not state information in the PCE context and so a model that uses it is still described as a stateless PCE. Stateful PCEs can be advantageous in many contexts, such as GMPLS networks, and require extensions to the PCEP.

FIGS. 3A-3C illustrate the PCE 22 as s stateful PCE. In FIG. 3A, the PCE 22 performs state synchronization with the PCC 24 to obtain characteristics of the network 20. For example, the PCE 22 can request an update with a message from the extensions to PCEP (PCUpd) and receive a response from the PCC 24 via a report message (PCRpt). The information exchanged can include bandwidth (i.e., available, granularity, etc.) as well as other characteristics (e.g., optical related constraints). In FIG. 3B, the PCC 24 is requesting a path for a connection 28 similar to FIG. 2. In FIG. 3C, the PCE 22 can modify the connection 28 for rerouting based on updated state conditions.

Figure 4:
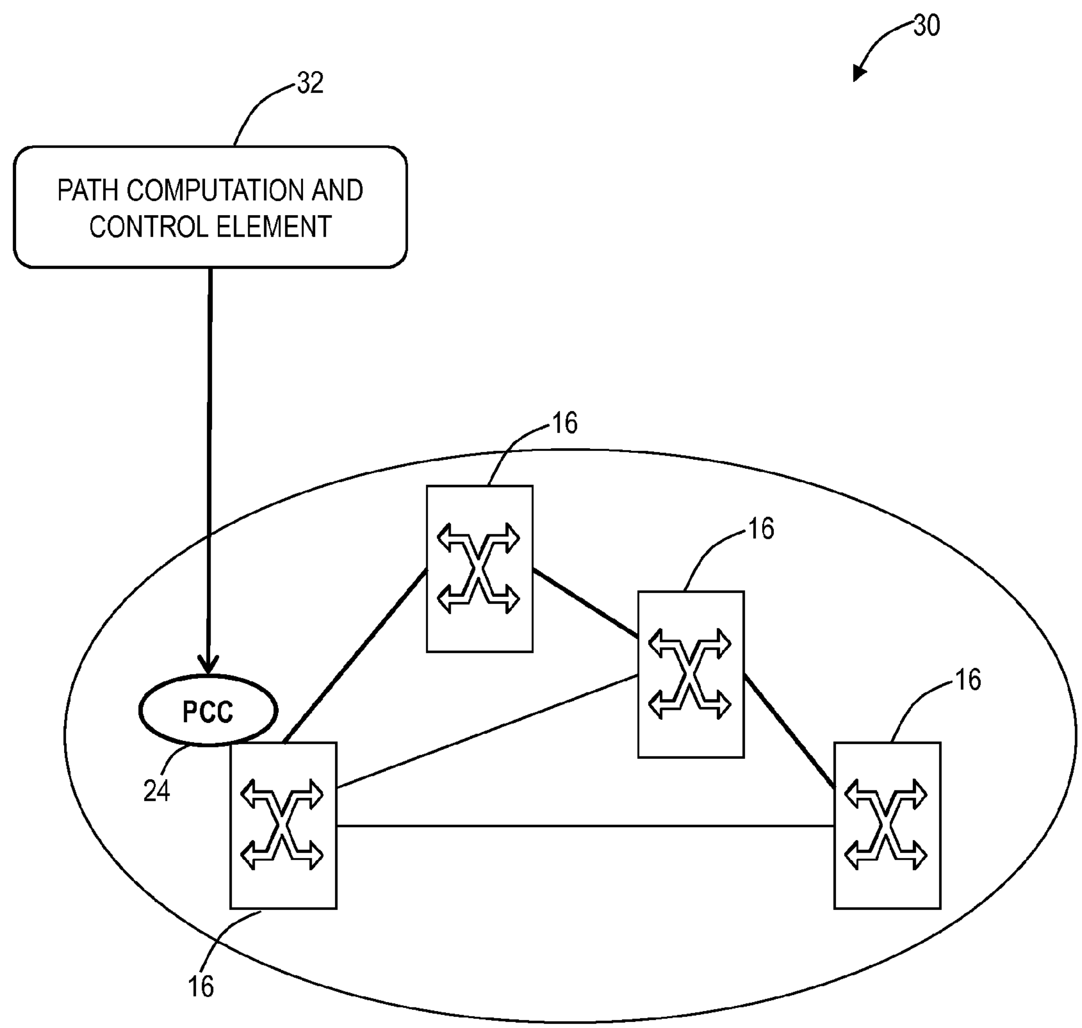
FIG. 4 is a network diagram of a network with a Path Computation and Control Element (PCCE)

Referring to FIG. 4, in an exemplary embodiment, a network diagram illustrates a network 30 with a Path Computation and Control Element (PCCE) 32. The PCCE 32 can be realized in a similar fashion as the PCE 22, i.e. an entity (e.g., component, application, or network node). Compared to the existing PCE architecture, the systems and methods allow the PCCE 32 itself to initiate and control connections instead of having to rely on the PCC 24 to request path computation and then delegate control to the PCE 22. The PCCE 32 can itself check for support of PCCE connection initiator functionality. At the same time, the systems and methods takes advantage of the PCE protocol's existing ability to carry all of the information necessary to specify the path and characteristics of a new connection, i.e. via the PCEP. Compared to existing distributed control architectures, the systems and methods described herein are not dependent on the client 12 to initiate connections or on a network management interface for the management systems 14 to initiate connections. Instead the PCCE 32 provides a northbound interface to applications allowing the applications to request connectivity. The PCCE 32 can from a central point and with knowledge of network topology and current connections, compute an optimal path to support the desired connectivity based on criteria such as network utilization, diversity from existing paths, distribution of load evenly across the network, or other criteria.

In the current PCE protocol, the PCE 22 and PCC 24 establish an association and then the PCE 22 responds to path requests from the PCC 24 with lists of nodes and links forming the recommended path for a new connection. In Stateful PCE, the PCC 24 additionally can delegate control over connections to the PCE 22, and the PCE 22 can cause changes to the connection such as rerouting its path or changing its state, e.g., causing the connection to be deleted. In the systems and methods described herein, the PCCE 32 initially establishes associations with each PCC 24 within a domain and indicates that the association is for connection initiation through the Connection Initiator flag in the association. The PCCE 32 may be configured with a list of PCCs 24 or it may have access to network topology through the network routing or control protocol and choose the set of network elements 16 to act as PCCs 24. For example, it may use network topology to determine all edge network elements 16 in the network topology and choose these nodes as potential PCCs 24 for connection initiation. If the network element 16 is not capable of supporting functionality for PCCE 32 connection initiation, it may reject the association with an appropriate error indication The PCCE 32 supports a northbound interface that allows applications to use the PCCE 32 to request connectivity from a source to destination without having to have detailed knowledge of the network topology.

Once association has been established, and an application uses the northbound interface to request connectivity, the PCCE 32 computes a desirable path and requests connection establishment from the PCC 24 at the source network element 16 for the connection (this could be at either end of the connection path) using the PCUpdate message, again with an Initiation Requested flag to indicate that the Update is for a new connection rather than an existing connection. The PCCE 32 creates a unique connection identifier incorporating its own PCE ID to distinguish future messages for the connection (the identifier must be unique to the PCCE 32 in order to avoid conflict with any connections initiated by the PCC 24 on its own). The PCUpdate message from the PCCE includes the requested path for the connection, determined from path computation at the PCCE. Once the PCC 24 has successfully created the connection through signaling, it returns a PCReport message to the PCCE 32 reporting the state of the connection as "active".

Figure 5:
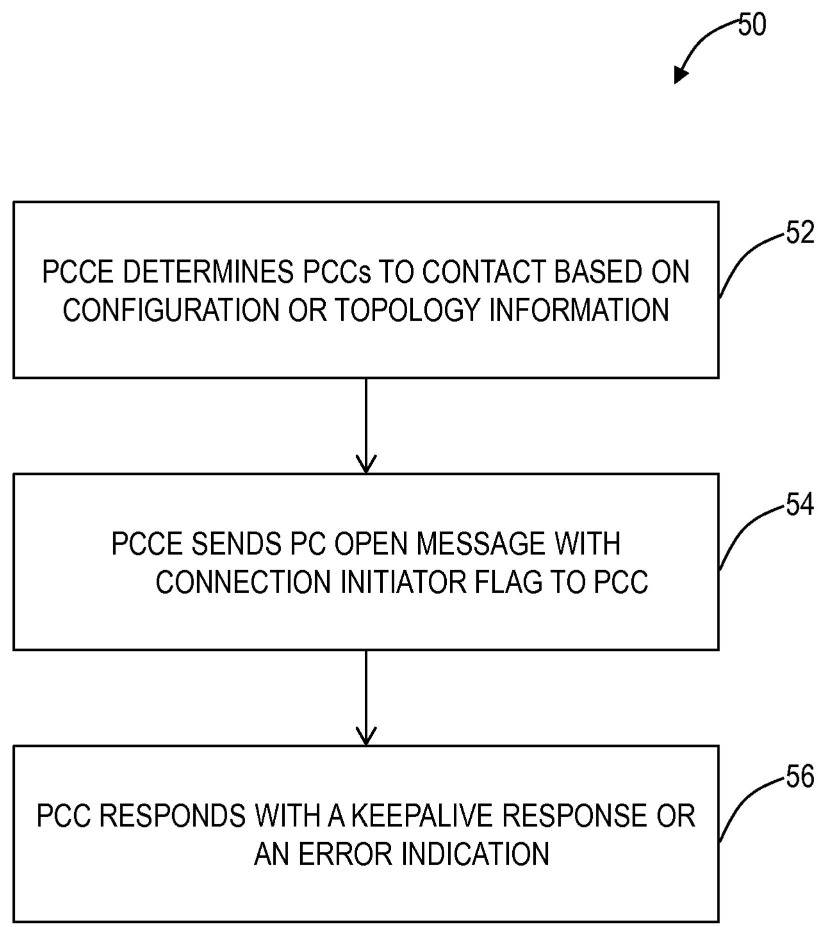
FIG. 5 is a flowchart of a PCCE initiation method.

Referring to FIG. 5, in an exemplary embodiment, a flowchart illustrates a PCCE initiation method 50. The PCCE initiation method 50 can be implemented by the PCCE 32 in the network 30 and in conjunction with the network elements 16 and/or the PCC 24. The PCCE initiation method 50 includes the PCCE determining which PCCs to contact based on configuration and/or topology information (step 52). As described herein, the PCCE may be configured with a list of PCCs or it may have access to network topology through the network routing protocol and choose the set of network elements to act as PCCs. For example, the PCCE can participate in receiving routing messages from the control plane thereby having an updated topology of the network. With knowledge of the network, the PCCE could determine which network elements are edge nodes as potential PCCs for connection initiation.

The PCCE sends a PCEP OPEN message with a connection initiator flag to each of the PCCs (step 54). The OPEN message is sent to establish a PCEP session between the PCCE and each of the PCCs. Specifically, the PCEP session is established between the PCCE and the PCCs over a Transmission Control Protocol (TCP) session. Each of the PCCs responds with a KeepAlive response to an error indication to the PCCE (step 54). For example, the OPEN message can include a KeepAlive time and a DeadTimer time. Assume that the PCCE and a PCC have set Keepalive=10 seconds and DeadTimer=40 seconds. This means that Keepalive messages (or any other PCEP message) are sent every 10 seconds and that it can be declared that the PCEP session is down if no PCEP message has been received within any 40-second period. Generally, the PCCE initiation method 50 is used for the PCCE to establish PCEP sessions with the network elements 16 for future connection requests.

Figure 6:
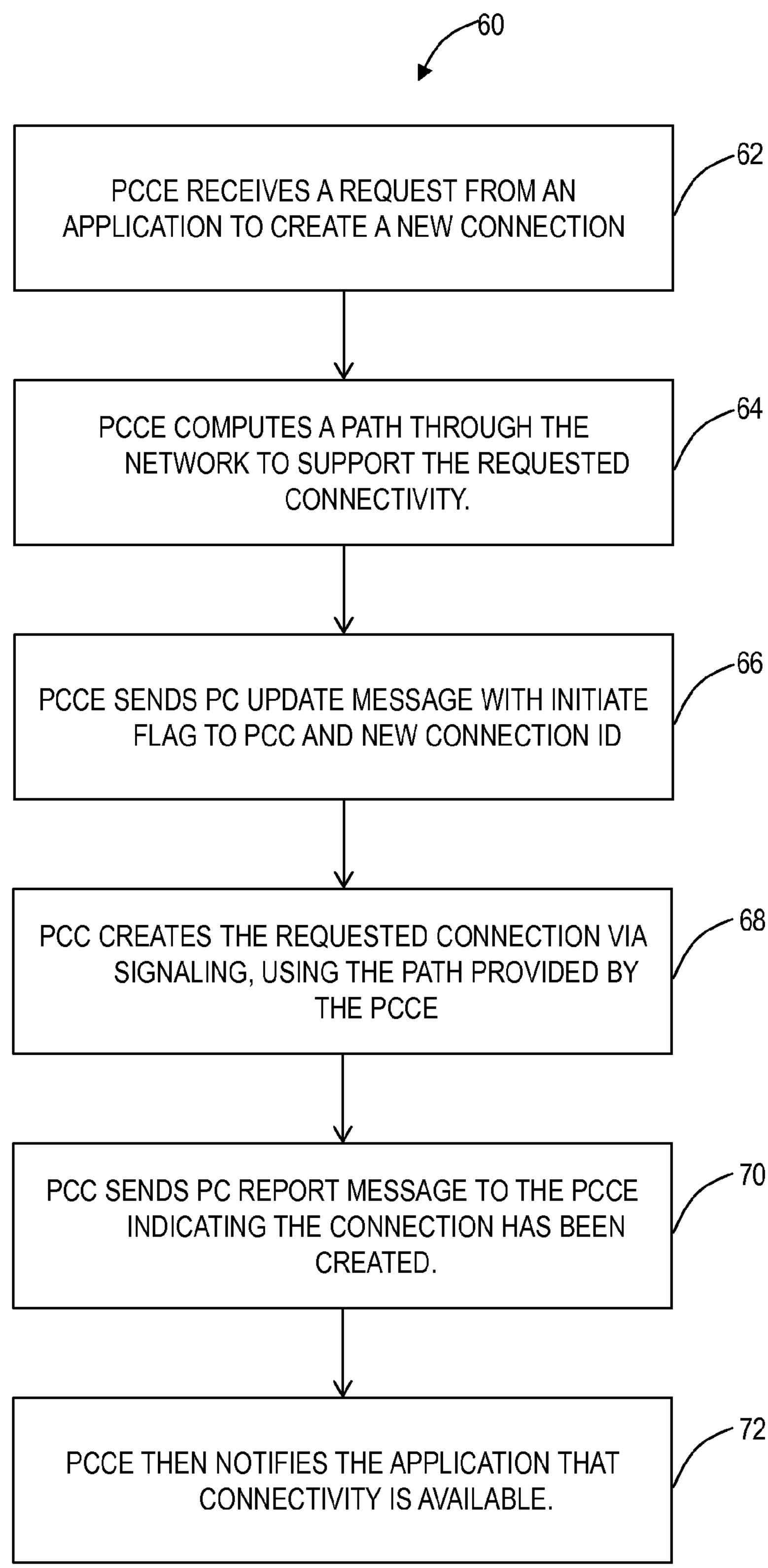
FIG. 6 is a flowchart of a PCCE connection creation method.

Referring to FIG. 6, in an exemplary embodiment, a flowchart illustrates a PCCE connection creation method 60. The PCCE connection creation method 60 can be implemented by the PCCE 32 in the network 30 and in conjunction with the network elements 16 and/or the PCC 24. Further, the PCCE connection creation method 60 can be used with the PCCE initiation method 50. The PCCE receive a request from an application to create a connection (step 62). In particular, applications are configured to request connections from the PCCE, such as using a northbound interface to the PCCE. Exemplary applications include, without limitation, clients, management systems, network elements, network elements in other domains, PCEs, other PCCEs, etc.

The PCCE computes a path through the network to support the requested connectivity in the request (step 64). Here, the PCCE can operate in a similar fashion as a stateful PCE with up-to-date knowledge of the network topology and available bandwidth in a PCCE database. The PCCE can perform path computation in similar manner as a PCE. The PCCE sends a PCEP UPDATE message with an initiate flag to the associated PCC along with a new connection ID (step 66). This can include the path, such as via an ERO. The associated PCC can be the source node of the new connection. The PCC creates the requested connection via signaling, using the path provided by the PCCE (step 68). For example, the PCC/source node can use the control plane to set up the connection. The PCC sends a PCEP REPORT message to the PCCE indicating the connection has been created (step 70). Here, the PCC is sending the REPORT message to maintain the proper state in the PCCE. The PCCE then notifies the application that the connectivity is available (step 72).

The PCCE systems and methods described here are a novel concept that has not been explored in the current work on PCE, it has significant advantages for allowing network operators to control and coordinate connections within their network both during their initial establishment and during the active lifetime of the connection. Various unique aspects of the PCCE systems and methods include, without limitation, the initiation of association by the PCCE based on configuration or topology information, inclusion of the Connection Initiator flag in the association, additional error indication if the PCCE connection initiation is not supported, support of a northbound interface from the PCCE to allow applications to indicate need for new connectivity from source to destination (interface can also convey information from PCCE to applications on network topology, use of the PC UPDATE message from the PCCE to create a new connection, flag to indicate Initiation Requested in the PC UPDATE message, procedure for creating a unique connection identifier, and use of the PC REPORT message to indicate connection complete.

Figure 7:
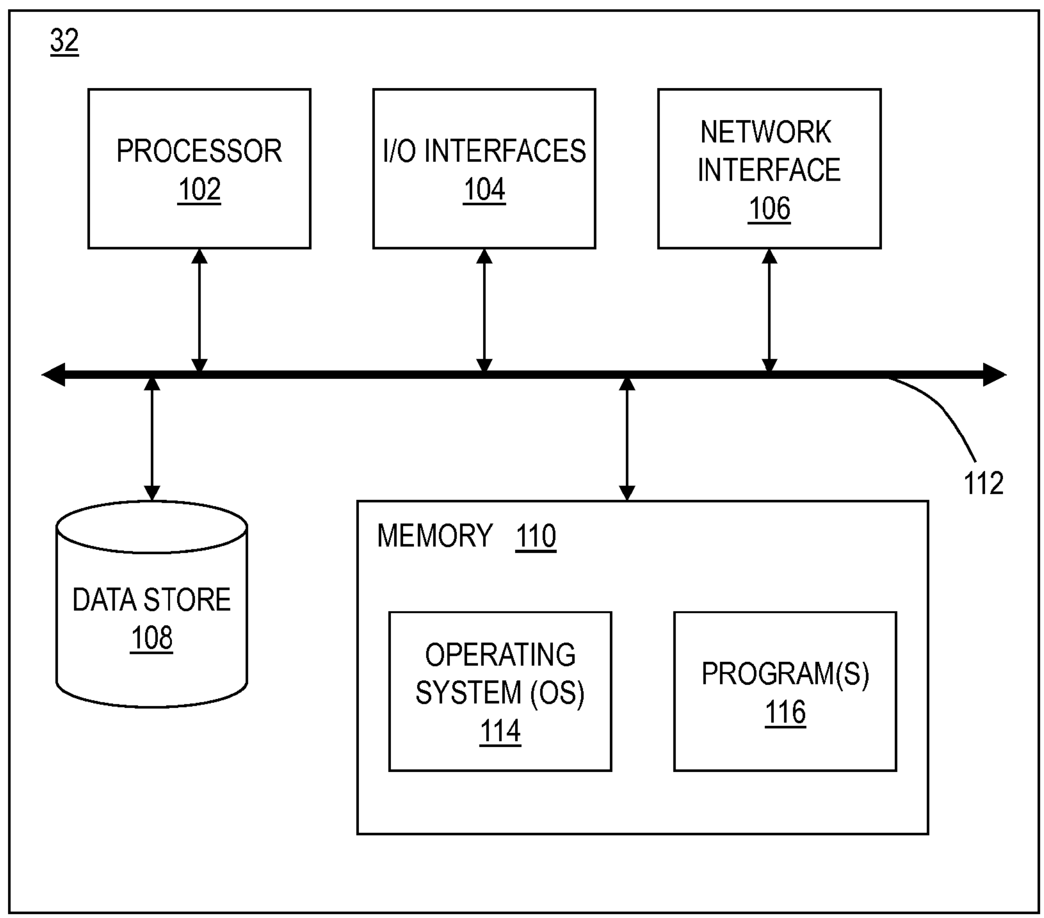
FIG. 7 is a block diagram illustrates an exemplary implementation of a PCCE.

Referring to FIG. 7, in an exemplary embodiment, a block diagram illustrates an exemplary implementation of the PCCE 32. The PCCE 32 can be a digital computer that, in terms of hardware architecture, generally includes a processor 102, input/output (I/O) interfaces 104, a network interface 106, a data store 108, and memory 110. It should be appreciated by those of ordinary skill in the art that FIG. 7 depicts the PCCE 32 in an oversimplified manner, and a practical embodiment may include additional components and suitably configured processing logic to support known or conventional operating features that are not described in detail herein. The components (102, 104, 106, 108, and 110) are communicatively coupled via a local interface 112. The local interface 112 can be, for example but not limited to, one or more buses or other wired or wireless connections, as is known in the art. The local interface 112 can have additional elements, which are omitted for simplicity, such as controllers, buffers (caches), drivers, repeaters, and receivers, among many others, to enable communications. Further, the local interface 112 can include address, control, and/or data connections to enable appropriate communications among the aforementioned components.

The processor 102 is a hardware device for executing software instructions. The processor 102 can be any custom made or commercially available processor, a central processing unit (CPU), an auxiliary processor among several processors associated with the PCCE 32, a semiconductor-based microprocessor (in the form of a microchip or chip set), or generally any device for executing software instructions. When the PCCE 32 is in operation, the processor 102 is configured to execute software stored within the memory 110, to communicate data to and from the memory 110, and to generally control operations of the PCCE 32 pursuant to the software instructions. The I/O interfaces 104 can be used to receive user input from and/or for providing system output to one or more devices or components. User input can be provided via, for example, a keyboard, touch pad, and/or a mouse. System output can be provided via a display device and a printer (not shown). I/O interfaces 104 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 106 can be used to enable the PCCE 32 to communicate on a network, such as to communicate with the PCC 24, the application, any of the network elements 16, etc. The network interface 106 can include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n). The network interface 106 can include address, control, and/or data connections to enable appropriate communications on the network. For example, PCEP sessions can be maintained by the PCCE 32 and the PCC over TCP through the network interface 106. The data store 108 can be used to store data. The data store 108 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 can incorporate electronic, magnetic, optical, and/or other types of storage media. The data store 108 can be used to store a PCCE database that maintains state information for any associated network.

The memory 110 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 can incorporate electronic, magnetic, optical, and/or other types of storage media. Note that the memory 110 can have a distributed architecture, where various components are situated remotely from one another, but can be accessed by the processor 102. The software in memory 110 can include one or more software programs, each of which includes an ordered listing of executable instructions for implementing logical functions. The software in the memory 110 includes a suitable operating system (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein.

In conjunction with the PCCE 32, the PCCE initiation method 50, and the PCCE connection creation method 60, it will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Figure 8:
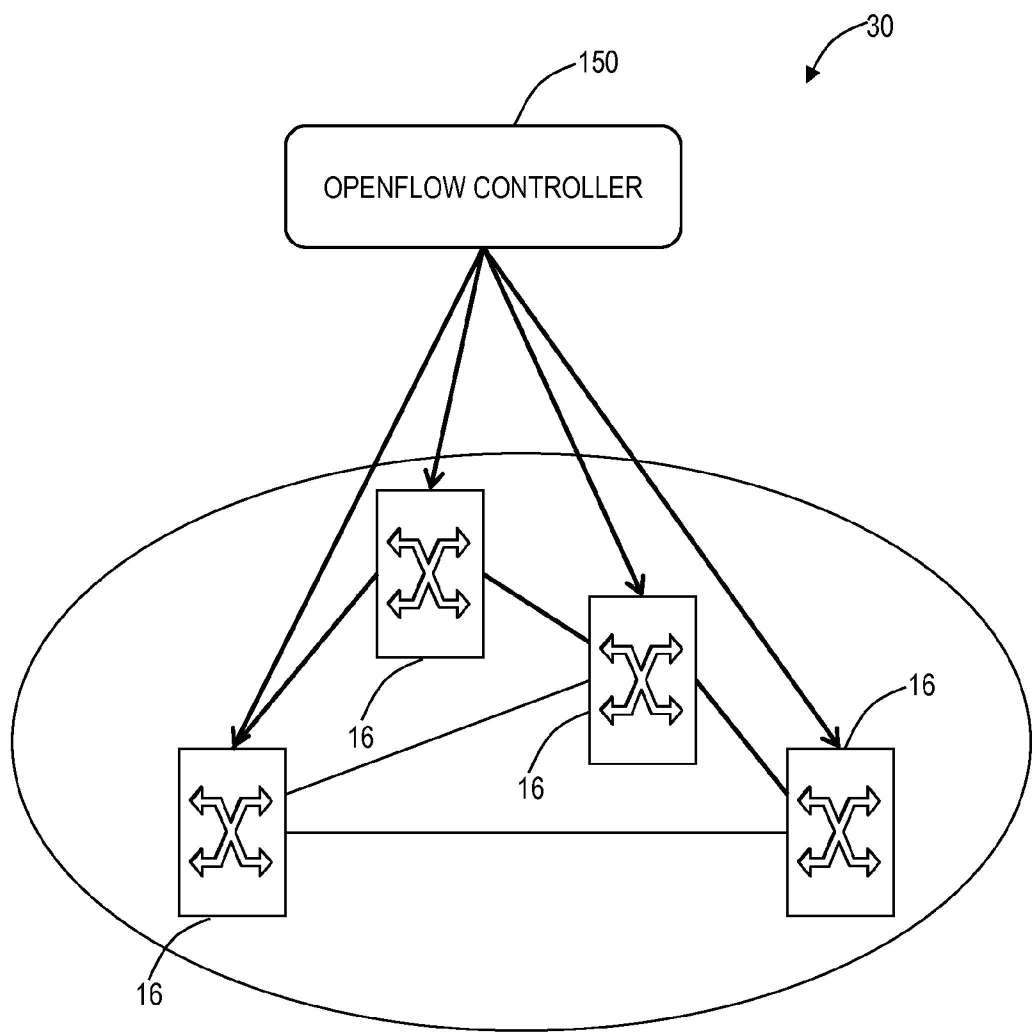
FIG. 8 is a network diagram of the network of FIG. 4 using an OpenFlow controller in lieu of the PCCE.

Referring to FIG. 8, a network diagram illustrates the network 30 using an OpenFlow controller 150 in lieu of the PCCE 32. In particular, FIG. 8 can be contrast with the PCCE 32 in FIG. 4. In OpenFlow as shown in FIG. 8, a special OpenFlow interface is required from the controller 150 to each network element 16 in the network 30 in order to provision the forwarding table at each network element 16 along a connection path in order to instantiate the forwarding behavior needed for the connection. Thus, OpenFlow is a centralized control technique that does not take advantage of existing distributed intelligence in the network elements 16 that provides greater efficiency and reliability than fully centralized control. The PCCE 32 seeks to combine several features of OpenFlow, PCEs, and distributed control planes for combining the provisioning of forwarding tables with a "tunnel" creation mechanism. The PCCE 32 creates an extension to the PCE architecture to allow a centralized application or applications to control the creation, rerouting and deletion of connections within the network 30. Compared to OpenFlow, the PCCE 32 is freed from interacting with each network element 16 in the connection (instead relying on the signaling intelligence in each network element 16 and the associated control plane for distributed creation of the connection). That is, the PCCE 32 is less resource intensive by leveraging the distributed control features. Because it is based on PCE technology, the PCCE takes advantage of PCE infrastructure that has already been standardized, tested and implemented as an interface to network elements.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A Software Defined Networking (SDN) method implemented in a Path Computation Element (PCE) in a network, the SDN method comprising:

receiving a request for a connection in the network from an application that does not have a detailed view of the network;

computing a path for the connection responsive to the request, wherein the PCE has up-to-date knowledge of network topology and available bandwidth in the network; and requesting a Path Computation Client (PCC) to establish the connection on the path, through a control plane of the network.

2. The SDN method of claim 1, further comprising:

establishing an association with one or more PCCs in the network, wherein the association is based on one of a list of the PCCs in the network and determining which nodes in the network should act as PCCs based on a topology of the network.

3. The SDN method of claim 2, wherein the one or more PCCs are edge nodes in the network.

4. The SDN method of claim 1, wherein the request is received via a northbound interface.

5. The SDN method of claim 1, wherein the request is received from the PCC.

6. The SDN method of claim 1, wherein the PCE updates a database with the up-to-date knowledge of network topology and available bandwidth in the network, based on information received from the control plane.

7. The SDN method of claim 1, wherein the PCE does not interact with every node in the path to establish the connection.

8. The SDN method of claim 1, wherein the PCE manages a state of the connection once established, without the PCC or source node of the connection having to delegate control to the PCE over the connection.

9. A Path Computation Element (PCE) in a network configured for Software Defined Networking (SDN), the PCE comprising:

a network interface;

a processor coupled to the network interface; and memory storing instructions that, when executed, cause the processor to receive a request for a connection in the network from an application that does not have a detailed view of the network, compute a path for the connection responsive to the request, and request a Path Computation Client (PCC) to establish the connection on the path, through a control plane of the network, wherein the PCE manages a state of the connection once established, without the PCC or source node of the connection having to delegate control to the PCE over the connection.

10. The PCE of claim 9, wherein the memory storing instructions that, when executed, further cause the processor to establish an association with one or more PCCs in the network, wherein the association is based on one of a list of the PCCs in the network and determining which nodes in the network should act as PCCs based on a topology of the network.

11. The PCE of claim 10, wherein the one or more PCCs are edge nodes in the network.

12. The PCE of claim 9, wherein the request is received via a northbound interface.

13. The PCE of claim 9, wherein the request is received from the PCC.

14. The PCE of claim 9, wherein, to compute the path, the PCE has up-to-date knowledge of network topology and available bandwidth in the network.

15. The PCE of claim 9, wherein the memory storing instructions that, when executed, further cause the processor to receive information from the control plane and update a database with network topology and available bandwidth in the network based thereon.

16. The PCE of claim 9, wherein the PCE does not interact with every node in the path to establish the connection.

17. A network configured for Software Defined Networking (SDN) utilizing a Path Computation Element (PCE), the network comprising:

a plurality of nodes communicatively coupled to one another;

a control plane operating between the plurality of network elements; and the PCE configured to receive a request for a connection in the network from an application that does not have a detailed view of the network, compute a path for the connection responsive to the request, and request a Path Computation Client (PCC) to establish the connection on the path, through a control plane of the network, wherein the PCE does not interact with every node in the path to establish the connection, and the PCE manages a state of the connection once established, without the PCC or source node of the connection having to delegate control to the PCE over the connection.

18. The network of claim 17, wherein the PCE is further configured to establish an association with one or more PCCs in the network, wherein the association is based on one of a list of the PCCs in the network and determining which nodes in the network should act as PCCs based on a topology of the network.

19. The network of claim 17, wherein, to compute the path, the PCE has up-to-date knowledge of network topology and available bandwidth in the network.

20. The network of claim 17, wherein the one or more PCCs are edge nodes in the network.

* * * * *